April 10, 1962     E. L. TOLF     3,028,609
FOLDING TENT CAR TOP SLEEPER

Filed Jan. 29, 1958     2 Sheets-Sheet 1

Inventor
Elmer L. Tolf

April 10, 1962 E. L. TOLF 3,028,609
FOLDING TENT CAR TOP SLEEPER
Filed Jan. 29, 1958 2 Sheets-Sheet 2

Inventor
Elmer L. Tolf

United States Patent Office 3,028,609
Patented Apr. 10, 1962

3,028,609
FOLDING TENT CAR TOP SLEEPER
Elmer L. Teif, Joliet, Ill.
(1514 W. 4th Place, Mesa, Ariz.)
Filed Jan. 29, 1958, Ser. No. 712,022
1 Claim. (Cl. 5—119)

The present invention relates to improvements in a portable tent arrangement of the kind provided with a base structure upon which the tent is collapsibly foldable when not in use and upon which base the tent is erectable in a manner to afford a sleeping compartment, and more particularly concerns the provision of a novel arrangement of this kind especially suitable for mounting upon the rigid top of a vehicle such as an automobile.

In car top sleepers heretofore proposed various complexities of structure have been involved making the same difficult to manipulate, especially by inexperienced persons. Furthermore, there has been the objection in prior devices of this kind to exposure of the user to inclement weather, such as cold, rainy, windy weather incident to climbing into and out of the bed provided by the sleeper, as well as lack of privacy, especially where it is desirable to dress or undress in the car rather than in the bed or bunk provided by the top sleeper.

It is accordingly an important object of the present invention to provide a sleeping device especially adapted for carriage and use upon the top of a rigid top motor vehicle, and which embodies desirable features of simplicity of construction, low production costs, ease of erection as well as foldability.

Another object of the invention is to provide a car top sleeping tent arrangement affording a novel protective curtain or shroud structure arranged to depend alongside the car upon which the sleeper tent is mounted.

A further object of the invention is to provide a car top sleeper tent having unusually simple and efficient means for facilitating erection or collapsing of the tent.

Still another object of the invention is to provide an improved car top sleeper tent structure which is adapted for use demounted from the car top on which it may normally be mounted.

Yet another object of the invention is to provide a novel car top sleeper with various accessories coacting with the collapsed folded tent structure to provide a compact, rugged and minimum size car top transportable unit.

Other objects, features and advantages of the present invention will be readily apparent from the following detailed description of a preferred embodiment thereof taken in conjunction with the accompanying drawings, in which.

Figure 1:
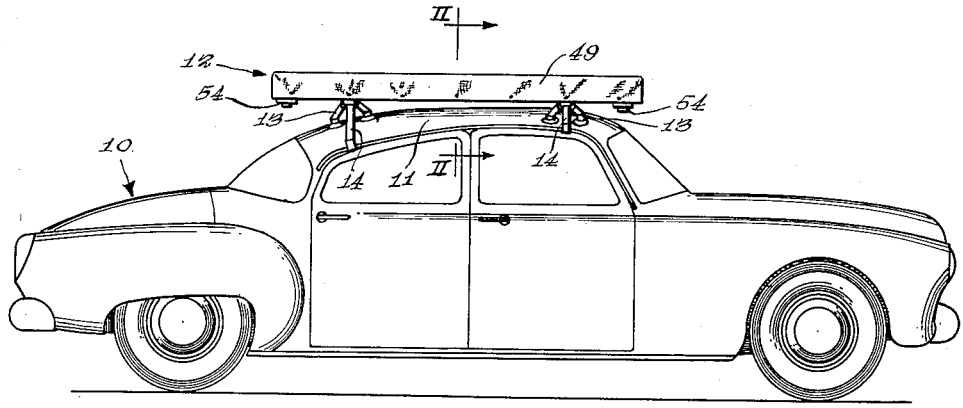
FIGURE 1 is a side elevational view of an automobile having mounted on the top thereof a sleeper unit embodying features of the invention.

Referring to FIG. 1, an automobile tent is shown having a rigid, more or less conventional turret top 11 upon which is mounted a sleeper unit 12. Mounting of the sleeper unit 12 may be effected in substantially the same manner as conventional top-mounted luggage carriers are mounted, including suction cup supporting legs 13 and top gutter engaging flexible strap-clip assemblies 14 holding the unit in stable relation upon the top 11.

Figure 2:
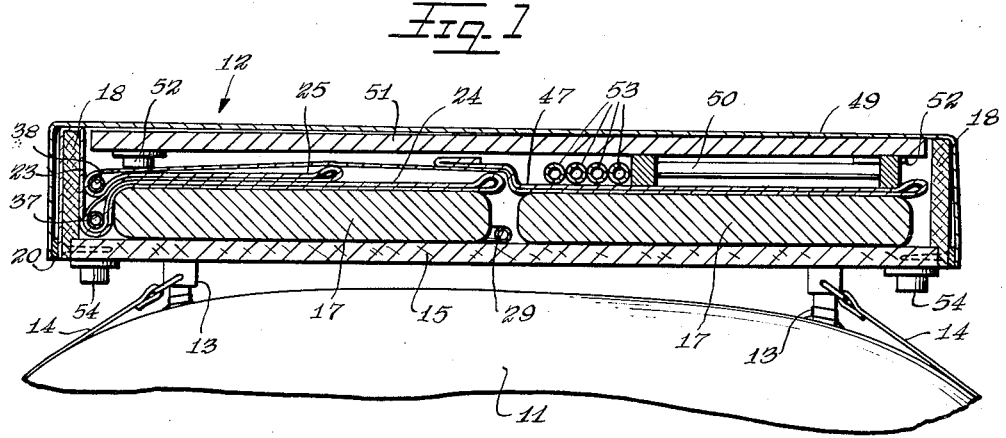
FIGURE 2 is an enlarged fragmentary sectional detail view taken substantially on the line II—II of FIGURE 1.

In a preferred form, the tent unit 12 includes a platform 15 which may be in the form of a sturdy plywood panel of the proper length and width, in the present instance sufficient to accommodate at least two sleeping persons upon a pair of thin mattresses or pads disposed in longitudinal, coextensive side-by-side relation upon the platform member 15 (FIG. 2). Entirely about the platform member 15 is an upright flange structure 18 of uniform height which may comprise wooden rail strips secured with lap butt joints to the respective edges of the base member 15 and secured together at their respective joining ends.

Figure 3:
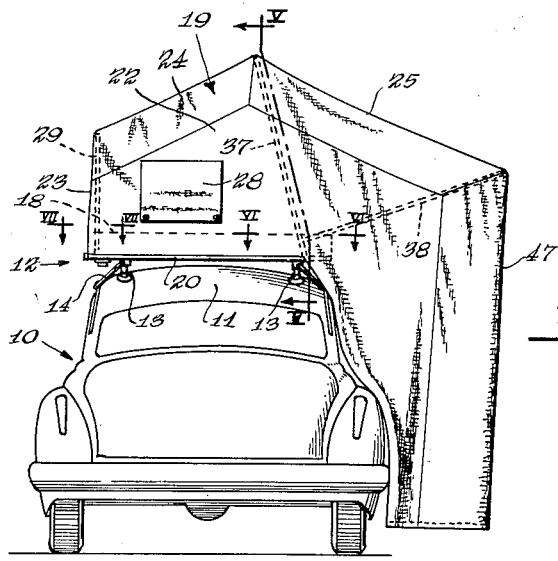
FIGURE 3 is a rear elevational view of the car and showing the sleeper tent in the erected condition thereof ready for use.
Figure 4:
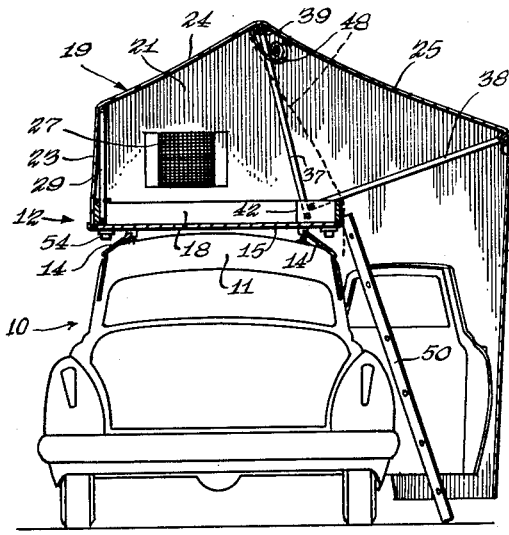
FIGURE 4 is a view similar to FIGURE 3 but showing a vertical sectional view of the tent structure taken in substantially the same plane as FIGURE 2.
Figure 5:
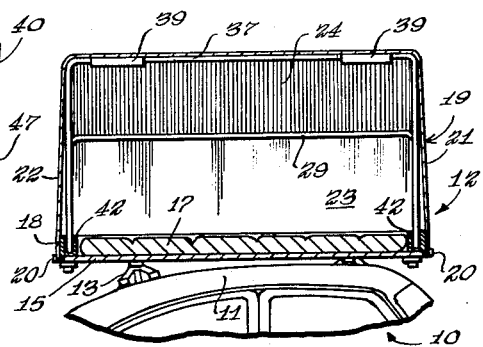
FIGURE 5 is a longitudinal sectional detail view taken substantially on the line V—V of FIGURE 3.

Attached to the upstanding flange 18 and foldably receivable over the platform member 15 is a tent 19 which may be made from any suitable tent fabric such as tent cloth, plastic sheet, and the like. By preference, the lower margins of the tent 19 are suitably secured to the outer sides of the front and rear as well as one of the side portions of the upstanding flange 18 of the base or platform structure. This may be effected by clampingly securing the lower marginal extremities of the tent by means such as securing slats 20 (FIGS. 2, 3, and 5). In addition to front and rear upright wall panels 21 and 22 respectively (FIGS. 3, 4, and 5), the tent has a relatively narrow side panel 23 on one side from which slopes upwardly and toward the other side a roof panel 24 joining on a front to rear peak a second roof panel 25 that slopes toward and substantially into overhanging relation beyond the opposite side of the supporting platform in the fully erected condition of the tent. Preferably the front and rear panels 21 and 22 are provided with screened window openings 27 (FIG. 4) which may be closed by respective flaps 28 (FIG. 3) mounted on the outer sides of the respective panels 21 and 22 and adapted to be rolled up to open the screened window openings.

Means for supporting the tent 19 in erected, sleeping compartment form in relation to the supporting platform 15 include a generally inverted U-shaped bar structure or bow 29 (FIGS. 3, 4, and 5) and having the lower ends of its depending legs pivotally secured as by means of respective bolts 30 (FIG. 7) to the inner sides of the respective front and rear portions of the upstanding flange 18 adjacent to the side portion of the flange 18 to which the tent side wall panel 23 is attached. The body bar of the bow 29 is engageable in the erected condition within the reentrant juncture between the wall panel 23 and the roof panel 24. In its collapsed position, the bow 29 is adapted to lie upon the platform member 15 with the main body bar of the bow located between the mattress pads 17 as best seen in FIG. 2 and with the end leg bar portions of the bow lying alongside the respective opposite ends of the mattress pad encompassed within the collapsed bow 29.

Figure 7:
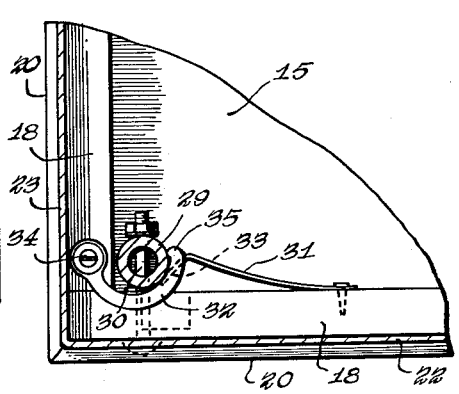
FIGURE 7 is an enlarged fragmentary sectional detail view taken substantially on the line VII—VII of FIG. 3.

For maintaining the bow member 29 in its upright, erected position against accidental collapse, suitable retaining detent latch means are provided which may comprise one or a combination of a spring detent member 31 and a latch hook 32 (FIG. 7). The spring latch detent member 31 comprises a flexible spring steel strip suitably secured at an end portion thereof remote from the adjacent leg portion of the bow 29 to the inner side of the platform flange 18 and normally adapted to spring out at its opposite end portion from the platform flange to interpose an angular cam head 33 in the path of collapse return of the associated arm or leg of the bow 29. The construction and relationship of the spring detent member 31 are such that as an incident to the swinging movement of the bow 29 into its upright position the detent head 33 snaps into retaining relation to the associated bow leg. However, when it is desired to collapse the bow member 29, the leverage effort exerted against the bow member will cause the spring detent member 31 to yield and flatten out and allow the associated bow leg to pass thereby.

The retaining hook latch 32 is of a more positive retaining structure, being for this purpose pivotally secured as at 34 to the upper face of the flange 18 alongside of and on an axis slightly forward of the axis of the associated leg of the bow 29. On its opposite end the hook latch member 32 has a latching tip 35 which is engageable about the inner side of the associated bow leg in upright condition, and at least slightly forward of center. The hook latch 32 may be manipulated into and out of latching position as and when desired.

Two additional frame bars in the form of inverted U-shape bows and comprising an intermediate tent ridge supporting bow 37 and an overhanging side supporting bow 38 complete the supporting frame structure for the tent. As best seen in FIGS. 3, 4, and 5, the frame bow 37 has its body bar connected to the inner side of the juncture between the roof panels 24 and 25 of the tent as by means of fabric connecting loop structure 39 and in the erected condition of the tent constitutes a support in the nature of a ridge pole for the top of the tent.

In the erected condition of the tent, the frame bow 38 (FIGS. 3 and 4) maintains the roof panel 25 of the tent in substantially stretched laterally overhanging relation to the side of the automobile 10 over which such roof panel is disposed. For this purpose, the main bar of the bow 38 is connected to the inner side of the lateral extremity of the roof panel 25 by suitable means such as one or more fabric connecting loops 40.

Both of the frame bows 37 and 38 are pivotally connected to the platform base 12 in a manner to enable collapsing of the bows upon one another onto the platform as best seen in FIG. 2, and to be swung into erected position simply by pulling on the side of the tent nearest the connection with the side projection bow 38. To this end both of the leg portions of each of the frame bows 37 and 38 are pivotally connected to the base platform in the manner best depicted in FIG. 6. Pivotal support for each of the legs of the frame bow 37 is provided by a respective pivot pin 41 conveniently in the form of a bolt extending through the respective adjacent end bar of the flange 18 and spaced a short distance inwardly from the adjacent side bar of the platform flange. Support for the inner end of the pivot pin bolt 41, in each instance, is provided by an upstanding flange bar 42 secured to the platform member 15 and providing with the adjacent end bar of the flange 18 from which it is appropriately spaced what may be termed a journal box arrangement in which the pivoted terminal portions of the frame bows 37 and 38 are located. Within the journal box a pivot pin bolt 43 pivotally secures the respective leg of the frame bow 38. For stiffening the structure and providing a positive spacer for the journal box flange bar 42 with respect to the adjacent end bar of the flange 18, a spacer block 44 is secured therebetween by means of a bolt 45.

Figure 6:
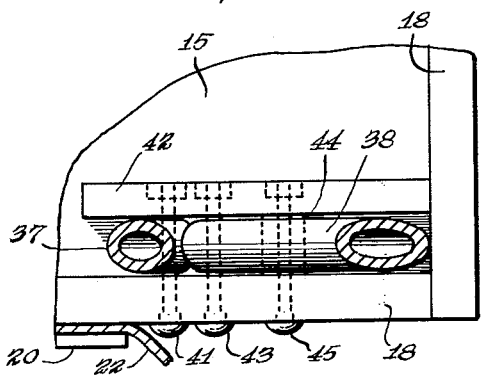
FIGURE 6 is a fragmentary enlarged sectional detail view taken substantially on the line VI—VI of FIGURE 3.

As will be best observed in FIGS. 4 and 6, the pivot 41 for the respective legs of the frame bow 37 is disposed near the inner end of the journal box, that is, near the end of such box away from the adjacent side bar of the platform flange 18, and as near as practicable to the platform member 15. On the other hand, the respective pivots 43 for the legs of the frame bow 38 are located as near as practicable to the top of the journal box and spaced slightly outwardly although in adjacent relation to the companion pivots 41 of the frame bow 37. This relationship is quite advantageous. For one thing, by having the legs of the frame bow 38 slightly longer than the legs of the frame bow 37, the two frame bows are adapted to be collapsed in overlapping relation as shown in FIG. 2 with the body bars thereof accommodated alongside the mattress pad 17 located on the opposite side of the platform from the pivotal mounting of these frame bows. Secondly, the particular pivotal relationship of the ends of the legs of the frame bows 37 and 38 places the terminus of each of the legs of the frame bow 38 in substantially locking relation to the adjacent end portions of the frame bow 37, as best visualized in FIG. 4 against laterally outward swinging movement of the ridge pole frame bow 37 toward the side extension frame bow 38 beyond a predetermined point wherein the ridge pole frame bow 37 supports the ridge of the tent in fully erected position. This relationship is attained automatically as an incident to swinging of the side extension frame bow 38 to its fully extended position. This obviates any danger of the tent collapsing toward the extended side due to any pulls or forces, wind created or otherwise, on the erected tent. In addition, in its fully extended position the end portions of the bow frame 38 come to rest upon the upper edge of the adjacent side frame bar of the upstanding flange 18 of the platform in an upwardly and outwardly angled position whereby the roof panel 25 is supported at a sufficient height above the underlying side of the platform to afford ample clearance for access into and out of the sleeping compartment provided by the tent.

A highly valuable feature of the present top sleeper tent construction resides in the provision of a protective generally tubular curtain 47 (FIGS. 3 and 4) arranged to depend from the laterally overhanging portion of the tent 19. At its outer side, the curtain 47 drops down from juncture with the roof panel 25, with the frame bow 38 affording support for the curtain. Front and rear wall panels for the tubular curtain are provided by extensions of the front and rear wall panels 21 and 22, respectively, of the tent. These front and rear wall panels of the curtain join the outer depending wall panel of the curtain and have the inner edges arranged for freely draping more or less conformably against the adjacent side of the automobile supporting the tent. Thus, the front to rear dimension of the tubular curtain 47 is equal to the length of the tent and the front and rear wall panels of the curtain thus have the free, car sidewall engaging edges thereof disposed in the erected condition of the tent respectively forwardly and rearwardly of the windows of the adjacent side of the car and more particularly the door or doors on that side of the car. Lateral clearance of the outer sidewall panel of the curtain 47 is preferably sufficient to enable opening of either or both of the adjacent side doors of the automobile as shown in FIG. 4 within the curtained enclosure provided by the curtain 47. At its lower edge the curtain 47 is preferably of a length to extend below the floor of the car but is short of the ground or other supporting surface upon which the car rests. As a result, a screen for privacy is provided by the curtain 47, as well as a protection against inclement weather. In cold weather heat from the interior of the automobile can be utilized in the sleeping compartment of the tent since the tubular curtain 47 will act as a flue to direct heat from an open door or window of the car within the curtain enclosure as may be created by the car heater. In the dark, light from the inside of the automobile through the windows thereof facing into the curtain enclosure will provide a fair degree of illumination by reflection from the inner wall surfaces of the curtain and the overlying roof panel 25.

To a substantial extent the depending tubular curtain 47 serves as a protection against insects entering into the sleeping compartment of the tent 19, but additional protection against insects may be provided by means of a flexible insect screen 48 (FIG. 4) which may be mounted on the inner side of the peak of the tent 19 and is adapted to be rolled up and out of the way as shown in full outline but is adapted to be dropped into screening relation as shown in dash outline when desired.

In the collapsed condition of the tent 19 as shown in FIGURE 2, the several wall, roof and curtain panels of the tent are folded in onto the mattress pads 17 and within the confines of the platform 15 as defined by the upstanding flange 18 thereon. Over the collapsed tent a protective cover 49 is adapted to be applied as shown in FIGS. 1 and 2. When it is desired to erect the tent, the cover 49 is removed and the folded-in curtain 47 is pulled laterally outwardly until the frame bows 37 and 38 are raised and swung into position to thereby draw the tent into erected position. As a final tent erecting maneuver, the side frame bow 29 is raised and swung into erected position. After such simple manipulation the tent is ready for top sleeper occupancy.

To facilitate climbing into the bed provided by the sleeper tent a ladder 50 may be provided (FIGS. 2 and 4) of a length to extend up to the platform 15 from the ground but short enough to be received conveniently upon the collapsed tent within the platform flange 18 for travelling purposes.

Figure 8:
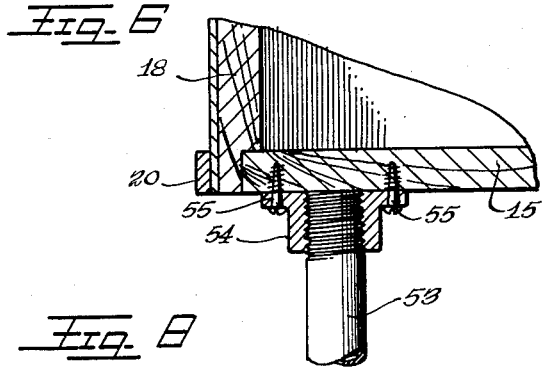
FIGURE 8 is a fragmentary enlarged sectional detail view showing one corner portion of the base of the tent structure with a supporting leg attached thereto when the tent is to be used in a position demounted with respect to the car.

Serving as a convenient hold-down for travelling, and as a level base for the top of the tent unit 12 when it is desired to carry luggage thereupon, is a plate or panel 51. This panel 51 is also adapted to be utilized as a table and for this purpose has on the underside adjacent to the corners thereof flanged screw-in socket members 52 into which the threaded ends of detachable legs 53 are adapted to be attached. These legs are adapted to be carried in detached condition on the collapsed tent with the ladder 50 under the panel 51 as shown in FIG. 2.

Where for any reason it is desired to use the sleeper tent assembly 12 demounted from the car top, the legs 53 may be used to support the platform 15 above the ground and for this purpose the platform member 15 may be provided on its underside adjacent to its respective corners with flanged screw-in sockets 54 (FIGS. 2 and 8) which may be attached thereto by means of screws 55 and are threadedly receptive of the threaded ends of the legs 53.

It will be understood that modifications and variations may be effected without departing from the scope of the novel concepts of the present invention.

I claim as my invention:

In a collapsible car sleeper unit, a platform arranged to be mounted upon a car top, said platform having entirely thereabout an upstanding marginal flange of predetermined height, a collapsible tent having wall panels secured to the platform about the outside of said flange, collapsible supporting frame means carried by the platform and attached to the platform at the inside of said flange, said collapsible supporting frame means and the tent being collapsibly received on the platform inside of said flange and in the collapsed condition reposing with substantial space thereabove to the top of said flange, and a removable hold down panel disposed upon the collapsed tent and supporting frame means and having its edges within and opposing said flange, said panel being of a thickness about equal to said space so that the top of the panel is about even with the top of said flange whereby a cover can be applied over the unit and over the top of said panel to hold the panel within the flange.

References Cited in the file of this patent
UNITED STATES PATENTS

| | | |
|---|---|---|
| 1,276,094 | Miller | Aug. 20, 1918 |
| 1,276,095 | Miller | Aug. 20, 1918 |
| 1,659,825 | Mackay | Feb. 21, 1928 |
| 1,752,571 | Olson | Apr. 1, 1930 |
| 1,984,681 | Jackson | Dec. 18, 1934 |
| 2,513,411 | Heil | July 4, 1950 |
| 2,530,450 | Cast | Nov. 21, 1950 |
| 2,644,574 | Mercier | July 7, 1953 |
| 2,662,232 | Daly | Dec. 15, 1953 |
| 2,710,977 | Fannin | June 21, 1955 |
| 2,930,051 | Kampmeier | Mar. 29, 1960 |

FOREIGN PATENTS

| | | |
|---|---|---|
| 344,982 | Italy | Dec. 5, 1936 |
| 377,669 | Italy | Jan. 2, 1940 |
| 313,285 | Switzerland | May 15, 1956 |